United States Patent

[11] 3,607,142

[72] Inventor Paul R. Mucenieks
  Trenton, N.J.
[21] Appl. No. 870,479
[22] Filed Dec. 4, 1969
[45] Patented Sept. 21, 1971
[73] Assignee FMC Corporation
  New York, N.Y.
  Continuation-in-part of application Ser. No. 688,525, Dec. 6, 1967.

[54] MANUFACTURE OF CRYSTALLINE POTASSIUM PEROXYDIPHOSPHATE
  6 Claims, 1 Drawing Fig.
[52] U.S. Cl. .................................................. 23/302,
  204/82, 23/106
[51] Int. Cl. ........................................... B01j 17/04,
  C01b 15/16
[50] Field of Search ............................................ 23/301,
  106, 107, 302; 204/82

[56] References Cited
  OTHER REFERENCES
  Lowery, Inorganic Chemistry, 1931 pages 495, 496

Primary Examiner—Norman Yudkoff
Assistant Examiner—S. Silverberg
Attorneys—Frank Ianno, Eugene G. Seems and Milton Zucker ABSTRACT: Potassium peroxydiphosphate ($K_4P_2O_8$) is prepared in nonhygroscopic, crystalline form, by evaporating water from the aqueous solution of product, potassium orthophosphate, and potassium fluoride which is obtained in the electrolytic production of the product, while maintaining the solution at a temperature between 50° C. and the solution boiling point, and its pH at between 11.0 and 13.5.

FLOW DIAGRAM OF THE CRYSTALLIZATION PROCESS

PATENTED SEP 21 1971
3,607,142
FLOW DIAGRAM OF THE CRYSTALLIZATION PROCESS
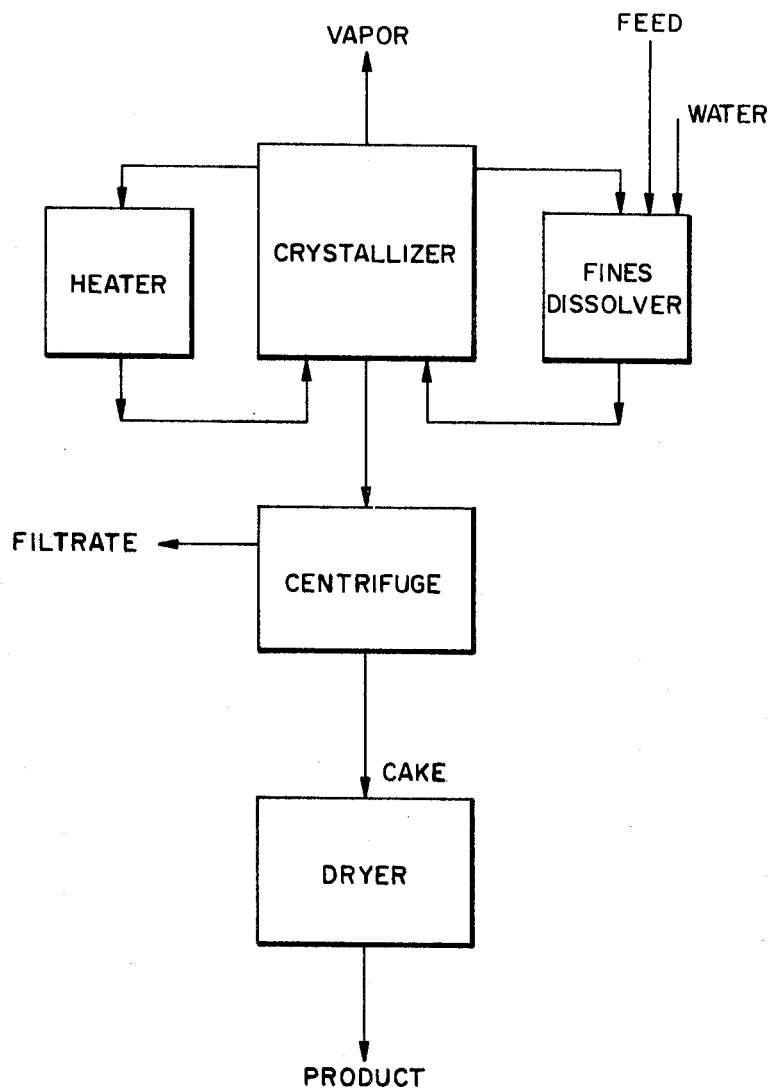
INVENTOR.
PAUL R. MUCENIEKS
BY

MANUFACTURE OF CRYSTALLINE POTASSIUM PEROXYDIPHOSPHATE

RELATED APPLICATIONS

This application is a continuation-in-part of my copending application Ser. No. 688,525 filed Dec. 6, 1967.

FIELD OF THE INVENTION

This invention relates to the recovery of free-flowing nonhygroscopic crystals of potassium peroxydiphosphate from solutions containing the product in admixture with potassium phosphate and potassium fluoride.

DESCRIPTION OF THE PRIOR ART

Potassium peroxydiphosphate has heretofore been prepared by the electrolysis of a mixture of potassium phosphate, potassium fluoride, and potassium chromate [Fichter et al., Helv. Chim. Acta 2, 3–26 (1919) and Fichter et al., Helv. Chim Acta 11, 323–327 (1928)]. The product obtained is noncrystalline and hygroscopic [Valinov et al., Russian Journal of Inorganic Chemistry, 6, 137–138 (1961) and Battaglia et al., Inorganic Chemistry 4, 552–558 (1965)]. Alcohol, which is useful in removing contaminants from other alkali metal peroxydiphosphates, is not effective with the potassium salt.

In my copending application Ser. No. 688,525, of which this is continuation-in-part, a method of preparation for potassium peroxydiphosphate is described, which method involves the electrolysis in a diaphragm cell of a solution of potassium phosphate containing phosphate, fluoride, and potassium ions, preferably having a phosphate ion concentration of from about 1 to 4 molar, a fluoride ion concentration of about 0.5 to 1.25 per phosphate ion, a potassium ion for each fluoride, and 2 to 3 potassium ions per phosphate ion. This application is directed to the method of recovering free-flowing nonhygroscopic crystals of potassium peroxydiphosphate from the anolytes obtained by utilizing the methods described in the said application.

SUMMARY OF THE INVENTION

I have found that crystalline nonhygroscopic potassium peroxydiphosphate can be prepared from aqueous solutions containing essentially potassium ions, peroxydiphosphate ions, phosphate ions, and fluoride ions, by adjusting the pH of the solutions to between 11.0 and 13.5, and preferably between 11.8 and 12.6, and concentrating the solution by evaporating water while heating the solution to between 50° C. and its boiling point, to obtain crystals relatively low in orthophosphate and fluoride. Preferably, the crystals are size separated, with fines being redissolved. If desired, the product may be recrystallized to produce a purer product.

THE DRAWING

The drawing is a flow sheet showing the sequence of steps used in practicing the invention.

DETAILED DESCRIPTION OF THE INVENTION

The preparation of nonhygroscopic crystals of potassium peroxydiphosphate is carried out in accordance with this invention, by evaporation of an aqueous solution containing potassium, peroxydiphosphate, phosphate, and fluoride ions, which is generally an anolyte obtained by electrolysis of an aqueous solution of a potassium orthophosphate-potassium fluoride mixture.

This is most preferably an anolyte obtained in accordance with my copending Ser. No. 688,525, obtained by electrolyzing a solution containing potassium phosphate and fluoride ions, preferably having a phosphate ion concentration of from about 1 to 4 molar, a fluoride concentration of about 0.5 to 1.25 per phosphate ion, a potassium ion for each fluoride ion, and 2 to 3 potassium ions for each phosphate ion. In the anolyte, the peroxydiphosphate ion concentration can be as low as 20% of the phosphate ion, and peroxydiphosphate will still precipitate, instead of phosphate; but for economic reasons there should be at least as much peroxydiphosphate as phosphate in the anolyte.

To obtain crystalline material, it is necessary that the temperature of the solution be at least 50° C.; it may be any higher temperature, but is limited by the boiling point of the solution at the pressure used in the evaporator. Since very high temperatures are not required, and superatmospheric pressure is uneconomical, the upper practical limit is 110° C., which is the boiling point of a typical anolyte.

The pH of the solution is equally important. It should be at least 11.0 and not exceed 13.5, and preferably beheld between 11.8 and 12.6. Outside these limits, the desired nonhygroscopic crystals are not obtained.

Batch evaporation may be used, but in general better results are obtained in a continuously operated evaporative crystallizer such as is shown in the flow sheet. The solution to be crystallized is fed into the crystallizer, through a fines dissolver, to which water is also added, so that the feed to the crystallizer is a mixture of fresh feed and dissolved fines. In the crystallizer, as water is evaporated, the coarser crystals form a slurry, while the fines and mother liquor are separated and transferred to the fines dissolver. The slurry is withdrawn into a centrifuge, which produces a liquid filtrate, containing most of the fluoride and orthophosphate ions. The cake goes to a dryer and to product, unless a particularly pure product is desired.

Where a purified product is desired, the first product is not dried, but is redissolved and recrystallized in a similar system, either alone or with addition of potassium orthophosphate to salt out the peroxydiphosphate. Typically, a product made in a single crystallization will contain about 93% potassium peroxydiphosphate, 0.5% KF, and about 6.5% orthophosphate. A single recrystallization will reduce potassium fluoride to below 0.1%, product free of fluoride can be obtained by washing the recrystallized product with a saturated solution of potassium peroxydiphosphate.

In the crystallization process, the precipitation of the peroxydiphosphate can be speeded up by adding orthophosphate to the liquor, in a typical salting-out procedure. Other salting-out agents can be used, but introduce contaminants which are preferably avoided.

If impurities accumulate in mother liquors, they can be cleaned up, in known fashion, by the use of filter aids or active carbon, most desirably at lower pH's, of the order of about 8 to 10.

A typical anolyte feed to the process will contain about 11% potassium fluoride, 13% potassium orthophosphate, and 17% peroxydiphosphate. After the first crystallization, the mother liquor will contain about 17% of fluoride, 20% orthophosphate, and only 4 to 5 % peroxydiphosphate. For recrystallization, the raw cake will yield a solution of about 40 to 42% peroxydiphosphate, 6% orthophosphate, and about 0.7 to 0.8% fluoride.

However, the concentrations indicated above are not critical for the practice of the invention. It is only essential that the peroxydiphosphate be precipitated at the necessary temperatures and within the indicated pH range to insure getting a desirable product.

Crystal size distribution is largely a function of the speed of crystallization, other factors being fixed. I prefer to crystallize rather slowly to maximize size and minimize fine production. A feed rate equivalent to one-third of crystallizer volume per hour is about the fastest rate consonant with desirably large crystals, but it may be exceeded if fine crystals are not objectionable.

SPECIFIC EXAMPLES OF THE INVENTION

Example 1 - Commercial Potassium Peroxydiphosphate

A 22 liter continuous evaporative crystallizer was used, connected as shown in the flow sheet. Feed solution was used containing 17% $K_4P_3O_8$, 13% $K_3PO_4$, and 11% KF. This solution (pH 12.0 to 12.2) was pumped into the fines dissolver at a rate of 2.8 liters per hour, along with water at the rate of 2.6 liters per hour, and overflow from the crystallizer at the rate of 9.6 liters per hour. The temperature in the crystallizer was maintained at 80°–90° C., and 3.5 kg. of water vapor was removed per hour. Slurry was withdrawn at the rate of 2 liters per hour from the bottom of the crystallizer, and filtered. Product (0.62 kg./hour) was obtained in the form of 100 to 50 mesh size free-flowing crystals. The product contained 93% $K_4P_3O_8$, 0.5% KF, and 6.5% orthophosphate.

Example 2 - Recrystallization

The product of example 1 was dissolved in water to produce a solution containing 41.6% $K_4P_2O_8$. This solution was pumped into the fines dissolver at a rate of 3.5 liters per hour along with water at the rate of 1.8 liters per hour and overflow from the crystallizer at the rate of 9.7 liters per hour. The temperature in the crystallizer was maintained at 80°–90° C. and 3.5 kg. of water vapor was removed per hour. Slurry was withdrawn at the rate of 2 liters per hour from the bottom of the crystallizer and filtered.

1.37 kg./hour of product was obtained in the form of free-flowing crystals. The product contained 98% $K_4P_2O_8$, 0.06% KF, and 1 percent orthophosphate.

Example 3 - Pure Product

The product of example 1 was dissolved in water to produce a solution containing 41.6% $K_4P_2O_8$. This solution was pumped into the fines dissolver at a rate of 2 liters per hour along with water at the rate of 2.1 liters per hour, 30% potassium phosphate solution at the rate of 1.7 liters per hour, and overflow from the crystallizer at the rate of 9.3 liters per hour.

The temperature in the crystallizer was maintained at 80°–90 C. and 3.5 kg. of water vapor was removed per hour. Slurry was withdrawn at the rate of 2 liters per hour from the bottom of the crystallizer and filtered.

1.1 kg. per hour of product was obtained in the form of free-flowing crystals. The product contained 92% $K_4P_2O_8$, 0.2% KF.

The advantage of process according to example 3 vs. example 2 is, that in example 3 more product is removed from the feed. Product removed in example 2 is 62% in example 3 it is 87% The disadvantage is less pure product in example 3.

Obviously, the examples can be multiplied indefinitely without departing from the scope of the invention as defined in the claims.

What is claimed is:

1. The process of producing free-flowing crystals of potassium peroxydiphosphate from an aqueous solution containing potassium, peroxydiphosphate, phosphate, and fluoride ions, which comprises evaporating water from such a solution with a pH between 11.0 and 13.5, at a temperature between 50° C. and the boiling point of the solution, to cause precipitation of free-flowing crystals of potassium peroxydiphosphate, and separating the crystals from the mother liquor.

2. The process of claim 1, in which the pH of the solution is maintained between 11.8 and 12.6.

3. The process of claim 1, in which the solution contains more peroxydiphosphate ion than phosphate ion.

4. The process of claim 1, in which the solution is an anolyte prepared by electrolyzing a solution of potassium phosphate and potassium fluoride containing a phosphate in concentration of from 1 to 4 molar, a fluoride ion in concentration of from 0.5 to 1.25 per phosphate ion, a potassium ion concentration for fluoride ion and 2 to 3 potassium ions per phosphate ion, until the phosphate is at least 50% converted to peroxydiphosphate.

5. The process of claim 1, in which the crystals are further purified by recrystallization.

6. The substantially pure potassium peroxydiphosphate product produced by the process of claim 1, said product being free-flowing crystals.

UNITED STATES PATENT OFFICE
CERTIFICATE OF CORRECTION

Patent No. 3,607,142          Dated 9/21/71

Inventor(s) Paul R. Mucenieks

It is certified that error appears in the above-identified patent and that said Letters Patent are hereby corrected as shown below:

Column 2, lines 53 and 54, "17% peroxydiphosphate" should read --17% potassium peroxydiphosphate--.

Column 3, line 3 "$K_4P_3O_8$" should read --$K_4P_2O_8$--.

Column 3, line 12 "$K_4P_3O_8$" should read --$K_4P_2O_8$--.

Column 3, line 35 "80°-90 C" should read --80°-90°C--.

Column 4, line 29 "for fluoride" should read --for each fluoride--.

Signed and sealed this 24th day of September 1974.

(SEAL)
Attest:

McCOY M. GIBSON JR.  
Attesting Officer

C. MARSHALL DANN  
Commissioner of Patents